United States Patent
Vandendijk et al.

(10) Patent No.: US 7,998,353 B2
(45) Date of Patent: Aug. 16, 2011

(54) FILTER CANDLE COMPRISING AN ELONGATED MESH PACK

(75) Inventors: Stefan Vandendijk, Tongeren (BE); Yakov Gerzon, Wilmington, NC (US)

(73) Assignee: NV Bekaert SA, Zwevegem (BE)

( * ) Notice: Subject to any disclaimer, the term of this patent is extended or adjusted under 35 U.S.C. 154(b) by 91 days.

(21) Appl. No.: 12/306,638

(22) PCT Filed: Jun. 28, 2007

(86) PCT No.: PCT/EP2007/005717
§ 371 (c)(1),
(2), (4) Date: Dec. 24, 2008

(87) PCT Pub. No.: WO2008/000468
PCT Pub. Date: Jan. 3, 2008

(65) Prior Publication Data
US 2009/0283481 A1 Nov. 19, 2009

(30) Foreign Application Priority Data
Jun. 30, 2006 (EP) .................................... 06013542

(51) Int. Cl.
*B01D 37/00* (2006.01)
*B01D 35/02* (2006.01)
(52) U.S. Cl. ........ 210/767; 210/790; 210/232; 210/434; 210/496; 210/510.1
(58) Field of Classification Search ................ None
See application file for complete search history.

(56) References Cited

U.S. PATENT DOCUMENTS

| | | | | |
|---|---|---|---|---|
| 3,288,299 A * | 11/1966 | Paton et al. | .................... | 210/487 |
| 3,882,024 A * | 5/1975 | Holmes et al. | ............. | 210/321.8 |
| 4,168,237 A * | 9/1979 | Pickett et al. | ................. | 210/440 |
| 4,283,280 A * | 8/1981 | Brownlee | ................... | 210/198.2 |
| 4,342,375 A * | 8/1982 | Lyden | .............................. | 184/65 |
| 4,346,004 A * | 8/1982 | Foucras et al. | ................ | 210/232 |

(Continued)

FOREIGN PATENT DOCUMENTS
EP          0 652 098 A2     5/1995
(Continued)

OTHER PUBLICATIONS
IPER of Jan. 6, 2009—6 pages.*
(Continued)

*Primary Examiner* — Robert James Popovics
(74) *Attorney, Agent, or Firm* — Bacon & Thomas, PLLC

(57) ABSTRACT

A filter candle 100 as subject of the present invention comprises: an elongated mesh pack 200 for filtering a fluid, comprising an end fitting 206 securely fixed to a filter medium 205. Further, a hollow core tube 300 is provided having a fluid permeable wall 310, the core tube being positioned within the axial opening of the mesh pack. The core tube 300 has an end flange 340 fixed to the outer end surface 312, which end flange is suitable for engaging the end fitting 206 on the mesh pack. A ring-shaped seal 500 is provided between and making contact with the outer end surface of the core tube, the end fitting and the end flange. The seal is a porous ring-shaped structure comprising a multitude of pores, which pores have an average pore size being equal or less than the filter rating of the filter medium.

9 Claims, 4 Drawing Sheets

U.S. PATENT DOCUMENTS

| | | | | |
|---|---|---|---|---|
| 4,419,234 | A * | 12/1983 | Miller et al. | 210/232 |
| 4,473,471 | A * | 9/1984 | Robichaud et al. | 210/443 |
| 4,769,052 | A * | 9/1988 | Kowalski | 210/315 |
| 4,812,235 | A * | 3/1989 | Seleman et al. | 210/247 |
| 4,964,993 | A * | 10/1990 | Stankiewicz | 210/510.1 |
| 5,279,733 | A * | 1/1994 | Heymans | 210/232 |
| 5,456,828 | A * | 10/1995 | Tersi et al. | 210/184 |
| 5,484,539 | A * | 1/1996 | Tersi et al. | 210/774 |
| 5,566,605 | A * | 10/1996 | Lebrun et al. | 99/302 C |
| 5,607,585 | A * | 3/1997 | Hobrecht et al. | 210/316 |
| 5,891,334 | A * | 4/1999 | Gundrum et al. | 210/232 |
| 6,270,703 | B1 * | 8/2001 | Wildman et al. | 264/39 |
| 6,329,625 | B1 * | 12/2001 | Quick et al. | 219/85.13 |
| 6,652,615 | B2 * | 11/2003 | Quick et al. | 55/502 |
| 6,932,907 | B2 * | 8/2005 | Haq et al. | 210/433.1 |
| 7,051,904 | B2 * | 5/2006 | Jeter | 222/189.11 |
| 7,210,584 | B2 * | 5/2007 | Wnuk et al | 210/484 |
| 2002/0011440 | A1 * | 1/2002 | Quick et al. | 210/493.2 |
| 2004/0188345 | A1 | 9/2004 | Wnuk et al. | |
| 2004/0206691 | A1 * | 10/2004 | Charin et al. | 210/493.1 |
| 2009/0283481 | A1 * | 11/2009 | Vandendijk et al. | 210/767 |
| 2010/0230340 | A1 * | 9/2010 | Bielawski et al. | 210/198.2 |
| 2011/0006015 | A1 * | 1/2011 | Leonard et al. | 210/767 |

FOREIGN PATENT DOCUMENTS

| | | |
|---|---|---|
| WO | WO 03/020396 A1 | 3/2003 |
| WO | WO 2008/000468 A1 * | 3/2008 |

OTHER PUBLICATIONS

Examination Report of EPO regarding European Patent Application No. 07 764907.7, Feb. 15, 2010.

* cited by examiner

FILTER CANDLE COMPRISING AN ELONGATED MESH PACK

TECHNICAL FIELD OF THE INVENTION

The present invention relates to filtration devices, more particular to candle filter apparatuses for filtration of fluids such as liquids, e.g. polymer filtration as well as to methods of manufacture and use of such filtration devices.

BACKGROUND OF THE INVENTION

Various filtration devices are known to filter polymers, i.e. molten or dissolved polymers, e.g. prior to spinning filaments from the molten or dissolved polymer using a spin pack or spinnerets.

The filtration devices for polymer filtration usually comprises filter candle, also named candle filters or tubular filters.

A filter candle apparatus for polymer filtration is disclosed in U.S. Pat. No. 5,279,733. The cooperating elements of a filter candle according to U.S. Pat. No. 5,279,733 are shown in FIG. 1 which is a reproduction of FIG. 1 of U.S. Pat. No. 5,279,733.

The filter candle according to prior art comprises a mesh pack 12, which mesh pack is usually provided from a pleated sintered metal fiber medium, creating an axial opening 13. At a first end, an end fitting 16 is fixed in a liquid tight manner to the filter medium and defines an axial opening 18 of the end fitting 16. At the opposite side, the mesh pack is provided with an end cap 14, which is also fixed in a liquid tight manner to the filter medium. In the void space of the mesh pack, defined by the filter medium, the end cap and the end fitting, a core tube 20 is inserted, which core tube 20 has a number of perforations 22 along the wall of the core tube. At one end, the core tube 20 is provided with an end member 24, being a flange and a threaded end 25 for coupling the filter candle to the other parts of the filter apparatus. The core tube is inserted in the axial opening 13 and the opening 18. In order to seal the core tube and the mesh pack in a liquid tight manner, the end fitting is provided with a recess along the opening 18 in which a ring shaped bearing 26 is provided. This ring shaped bearing 26 is a stainless steel spring having a C-shaped cross section, the opening of the C-shape preferably pointing downwards. The mesh pack with inserted core tube is inserted in a basket-like outer guard 28 via an axial opening 30. The guard, mesh pack and core tube are coupled by means of a screw 34. The bearing engages the recess of the end fitting, the end flange and the lower outer side of the core tube. As shown in more detail in FIG. 2, due to the compression provided by the mounting of the mesh pack 12, core tube 20 and guard, the C-shaped ring 26 seals the mesh pack 12 and the core tube 20, prohibiting polymer to flow to the core tube without passing through the filter medium of the mesh pack.

The filter candle, which is to filter polymer "outside-in", has some disadvantages. Usually, high pressure is used during filtration, e.g. process pressures in the range of 200 bar to 500 bar, and using pressure drops over the filter candle of up to 150 bar, which pressures are necessary due to the high viscosity of the polymer fluid, e.g. about 100 Pa*s to 1000 Pa*s. Due to this pressure, some polymer is forced to flow in the small interstices 41 between the bearing 26 and the mesh pack end fitting 13 or in the small interstices 40 between the core tube 20 and the bearing 26 and end fitting 40. The polymer, which is pressed in the interstices, will no longer flow and harden, causing the polymer to become brittle, usually blackened. After some time, the brittle polymer will loosen and create hard polymer particles in the polymer fluid. The interstices 40 are located at the clean, filtrate side of the filter membrane. So the polymer particles, which are created at these interstices, will flow along with the filtered polymer, and may cause problems in the further process, which uses the filtered polymer. E.g. it may cause spinnerets to be clogged partially, or create black contamination is polymer articles using the filtered polymer.

A second disadvantage of the prior art filter candles as shown in FIG. 1 and FIG. 2, is the reusability of the bearings 26. Once used, the bearings usually have to be thrown away, because they loose part of their springiness, and they can be contaminated by brittle polymer to a too large extent, making cleaning no longer economical or practical.

SUMMARY OF THE INVENTION

It is an object of the present invention to provide good filter candles as well as a method of making them.

A filter candle as subject of the present invention has the advantage that it avoids dead zones in the filter candle where the fluid being filtered stagnates, especially at the outflow side of the filter medium. Some embodiments of filter candles of the present invention reduce the risk of creation of brittle polymer particles at the outflow side of the filter candle's filter medium when being used to filter molten or dissolved polymer.

It is another advantage of the present invention that some embodiments of the present invention can be disassembled and cleaned more easily.

It is another advantage of the present invention that some elements of the filter candle, such as the end fitting of the mesh pack can be provided having a less complex shape, requiring less machining.

The above objective is accomplished by a filter candle according to the present invention.

According to a first aspect of the present invention, filter candle comprises:

an elongated mesh pack for filtering a fluid, the elongated mesh pack defining an mesh pack axial opening.

For example, the mesh pack comprises a filter medium for filtration of a fluid and has an end fining securely fixed to the filter medium.

The end fitting can provide a first end of the mesh pack and has an end inner surface defining an end fitting opening through the end fitting, which end fitting opening is co-axial with the axial opening of the mesh pack.

The filter candle also has a hollow core tube having a fluid permeable wall, the core tube is positioned within the axial opening of the mesh pack and is removably slidable through the mesh pack axial opening.

The core tube can have a first outer end having an outer end surface. The core tube can have an end flange fixed to the outer end surface, which end flange is suitable for engaging the end fitting on the mesh pack.

The filter candle also has a ring-shaped seal provided between and making contact with the outer end surface of the core tube and the end inner surface of the end fitting and the end flange.

The seal can encircle the outer end surface of the outer end of the core tube.

The seal can be a porous ring-shaped structure comprising a multitude of pores, which pores have an average pore size being equal or less than the filter rating of the filter medium.

According to some embodiments of the present invention, the porous ring-shaped structure may comprise sintered metal powder. According to some embodiments of the present invention, the porous ring-shaped structure may comprise sintered metal fibers. According to some embodiments of the present invention, the porous ring-shaped structure may consist of sintered metal fibers.

According to some embodiments of the present invention, the porous ring-shaped structure may have a substantially rectangular cross section.

According to some embodiments of the present invention, the end inner surface of the end fitting may be substantially cylindrical or the end inner surface of the end fitting may be substantially conical.

According to some embodiments of the present invention, the end inner surface of the end fitting may comprise a recess.

According to some embodiments of the present invention, the outer end surface of the core tube may comprise at least one bevelled section, bevelled towards the end flange fixed to the outer end surface. According to some embodiments of the present invention, the outer end surface of the core tube may comprise at least one bevelled section, bevelled towards the end flange fixed to the outer end surface and contacting the end flange fixed to the outer end surface.

According to a second aspect of the present invention, the filter candle according to the first aspect of the present invention may be used for filtration of molten or dissolved polymer.

Particular and preferred aspects of the invention are set out in the accompanying independent and dependent claims. Features from the dependent claims may be combined with features of the independent claims and with features of other dependent claims as appropriate and not merely as explicitly set out in the claims.

Although there has been constant improvement, change and evolution of devices in this field, the present concepts are believed to represent substantial new and novel improvements, including departures from prior practices, resulting in the provision of more efficient, stable and reliable devices of this nature.

The teaching of the present invention permits the design of improved filter apparatus for filtering fluids, especially to be used for filtration of viscous fluids, e.g. molten polymer or dissolved polymer. After disassembly of the filter apparatus comprising one or more filter candles as subject of the present invention, a more efficient and complete cleaning can be obtained. Such more complete and efficient cleaning results in a longer life time of the whole filter apparatus, up to an increase of 20% to 30% life time. It was also found that the production yield (throughput per $m^2$ per time) after cleaning of the filter apparatus is increased. Whereas for presently known filter apparatuses, cleaning of the apparatus results in a yield loss of about 20%, for apparatuses as subject of the present invention, the yield loss due to a cleaning operation is only up to 10%.

The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

Figure 1:
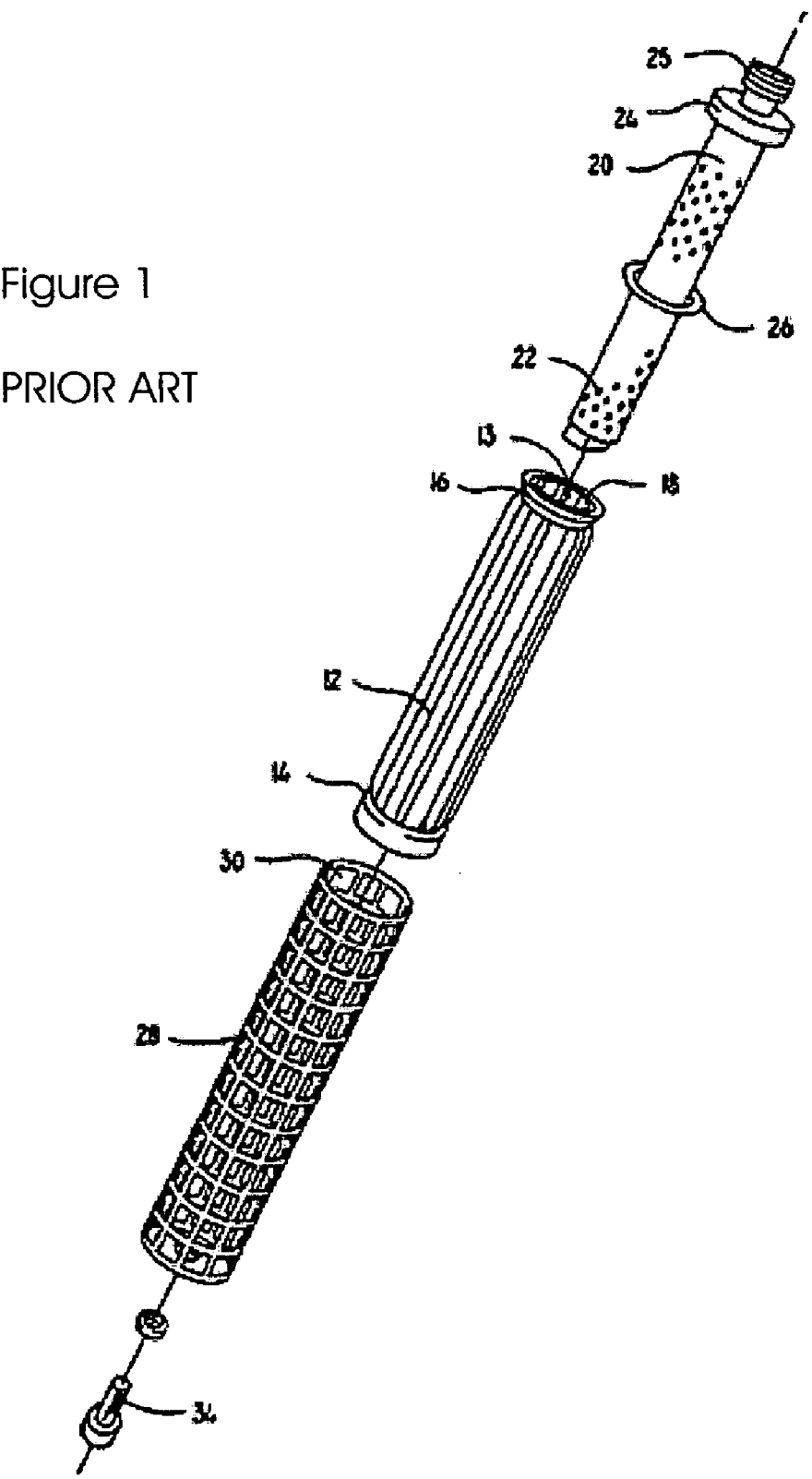
FIG. 1 is a schematical view of a filter candle of prior art.
Figure 2:
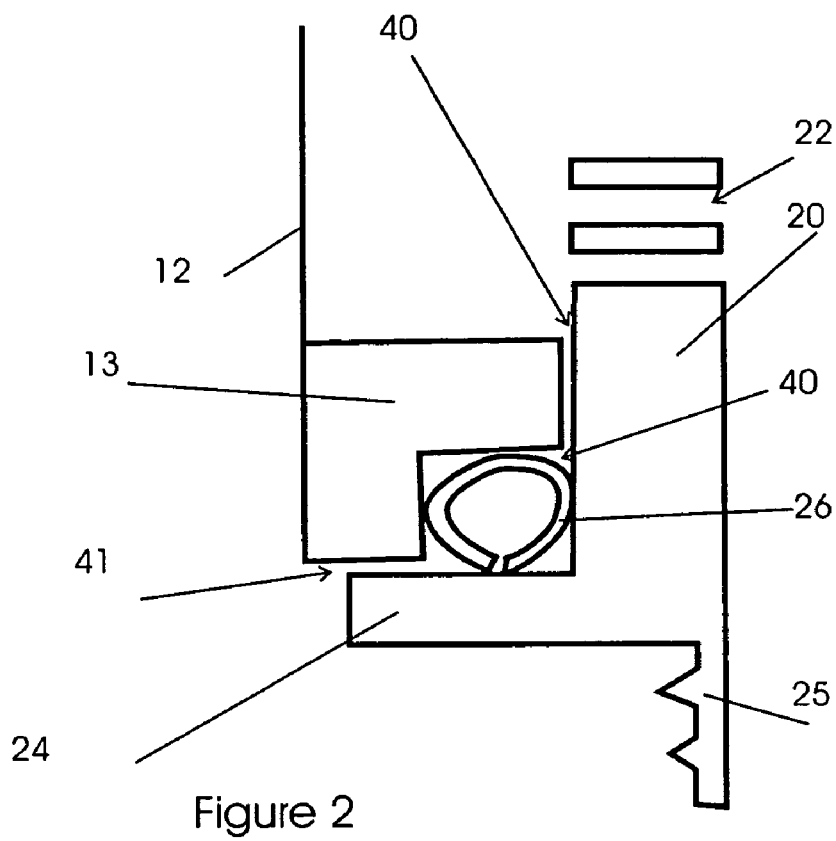
FIG. 2 shows a detail of the bearing used in the filter candle of FIG. 1.

In the different figures, the same reference signs refer to the same or analogous elements.

DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Similarly, it is to be noticed that the term "coupled", also used in the claims, should not be interpreted as being restricted to direct connections only. Thus, the scope of the expression "a device A coupled to a device B" should not be limited to devices or systems wherein an output of device A is directly connected to an input of device B. It means that there exists a path between an output of A and an input of B which may be a path including other devices or means.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

The following terms are provided solely to aid in the understanding of the invention. These definitions should not be construed to have a scope less than understood by a person of ordinary skill in the art.

The term "filter rating being X μm" is to be understood as 98.5% of the particles having an average diameter of x μm are retained, and is measured according to the standard ISO4572.

The term "average pore size" is to be understood as the Mean flow pore diameter and is measured making use of a capillary flow porometer, e.g. from the company Porous Materials Inc.

The term "porosity" P is to be understood as $P=100*(1-d)$ wherein d=(weight of 1 $m^3$ porous material)/(SF) wherein SF=specific weight per $m^3$ of the substance out of which the porous material is provided. As an example, the porosity of a sintered metal fiber product or sintered metal particle product is calculated as set out above, using "d" as the weight of 1 $m^3$ sintered metal fiber product or sintered metal powder product, and SF being the specific weight per $m^3$ of the alloy out of which the metal fibers or metal powder is made.

The term "metal fiber" is to be understood as a fiber made of any metal or metal alloy. An example of a suitable alloy is a stainless steel alloy such as AISI316 or AISI316 e.g. AISI316L. Metal fibers may be provided by different suitable production processes such as e.g. bundle drawing process according to U.S. Pat. No. 3,379,000, coil shaving process such as known from EP319959 or metal fibers provided by melt extraction such as described in U.S. Pat. No. 5,027,886. Metal fibers are characterised by an equivalent diameter, for the invention preferably in the range of 1 μm to 120 μm, such as in the range of 1 μm to 60 μm. The fibers may be endless long fibers (also referred to as filaments,) or may be provided as staple fibers having an average length in the range of 1 mm to 90 mm. Optionally, the metal fibers are short metal fibers, obtained from the method as described in WO02/057035, WO2005/099863, WO2005/099864 and WO2005/099940.

The term "filter medium" is to be understood any medium, which is able to separate particles from a fluid. The particles may be liquid or solid. The filter mediums used for the present invention may be suitable for surface filtration as well as depth filtration. Filter mediums preferably have a thickness in the range from 0.025 mm to 2 mm, and may have a porosity P in the range of 40% to 95%. Metal fibers may be used for the filter medium. Optionally, metal fibers may be blended with ceramic fibers and/or with ceramic powder and/or ceramic whiskers and/or metal powder. Preferably the particle diameter is less than ⅕ of the equivalent diameter of the fibers used. A medium being a combination of short metal fibers and staple fibers and/or metal powder may as well be used, e.g. a combination of short metal fibers and staple metal fibers, the combination comprising up to 20% in weight of staple metal fibers.

The filter mediums are preferably sintered filter mediums, especially in case the filtration medium comprises or consists of metal fibers or metal powder. Alternatively the filter medium may be a woven filter medium.

Metal fiber filter mediums may be provided by the methods as described in WO2005/099863, WO2005/099864 and WO2005/099940. Optionally, the filter mediums may further comprise metal wires or metal expanded plates to reinforce the filter medium. Metal wires may be present as metal wire mesh or grid. Alternatively or additionally, the filter medium may comprise metal powder sheets, perforated sheets such as perforated synthetic sheets or expanded synthetic sheets.

The term "ring shape" is to be understood as having a shape with an outer edge and an inner edge which inner edge encompasses the centre of the outer edge and which inner edge is usually concentric with the outer edge, although the inner and/or outer edge is not necessarily circular. Circular edges are however preferred.

The terms "substantially rectangular", "substantially conical" and "substantially cylindrical" are to be understood as allowing deviation from a perfect rectangular, conical or cylindrical shape due, for example, to normal production tolerances. Angular deviations or deviation on length dimensions of plus or minus 3% are to be seen as normal production tolerances.

The invention will now be described by a detailed description of several embodiments of the invention. It is clear that other embodiments of the invention can be configured according to the knowledge of persons skilled in the art without departing from the true spirit or technical teaching of the invention, the invention being limited only by the terms of the appended claims.

Figure 3:
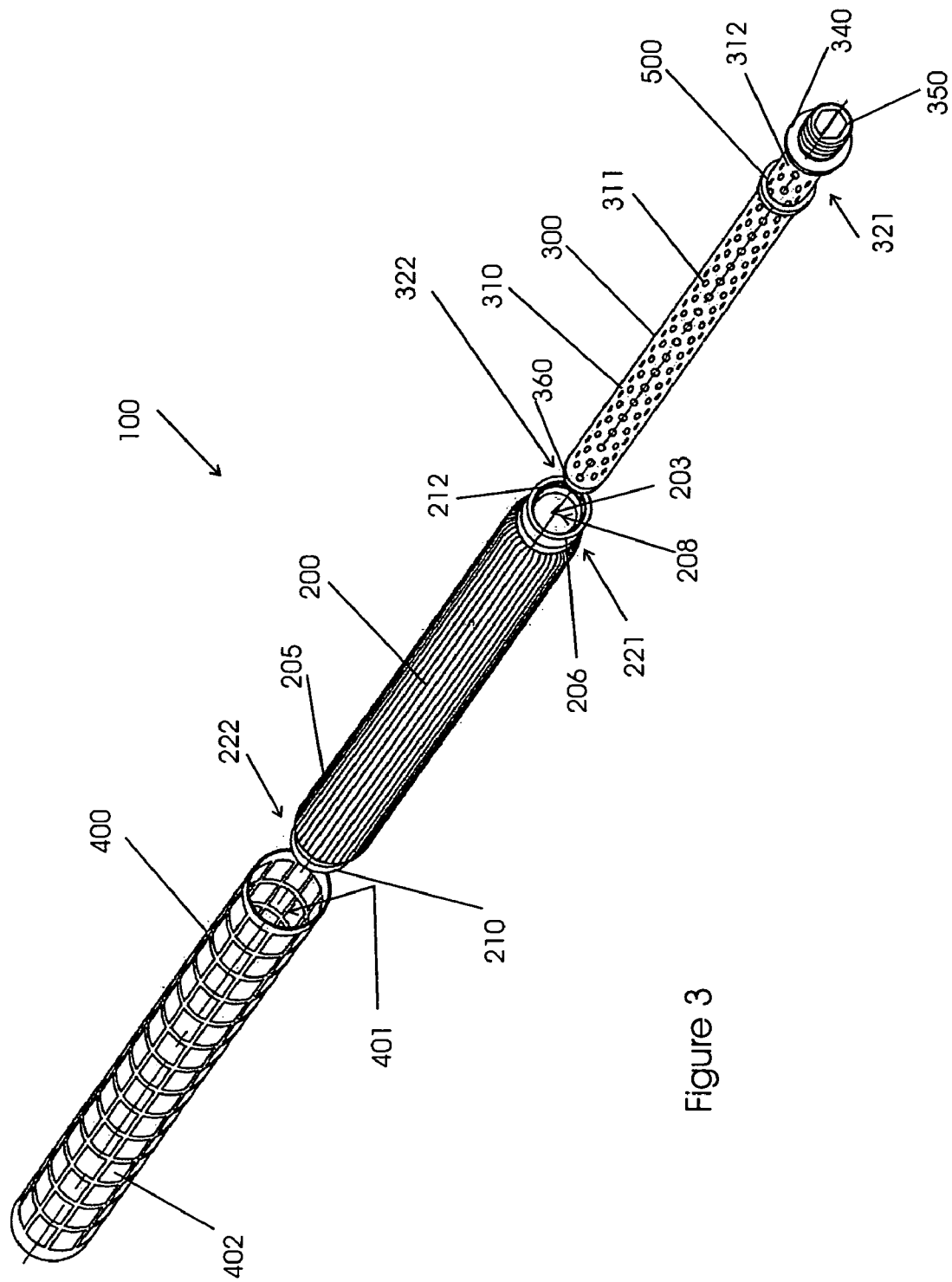
FIG. 3 is a schematical view of an assembly of a filter candle as an embodiment of the present invention.
Figure 4:
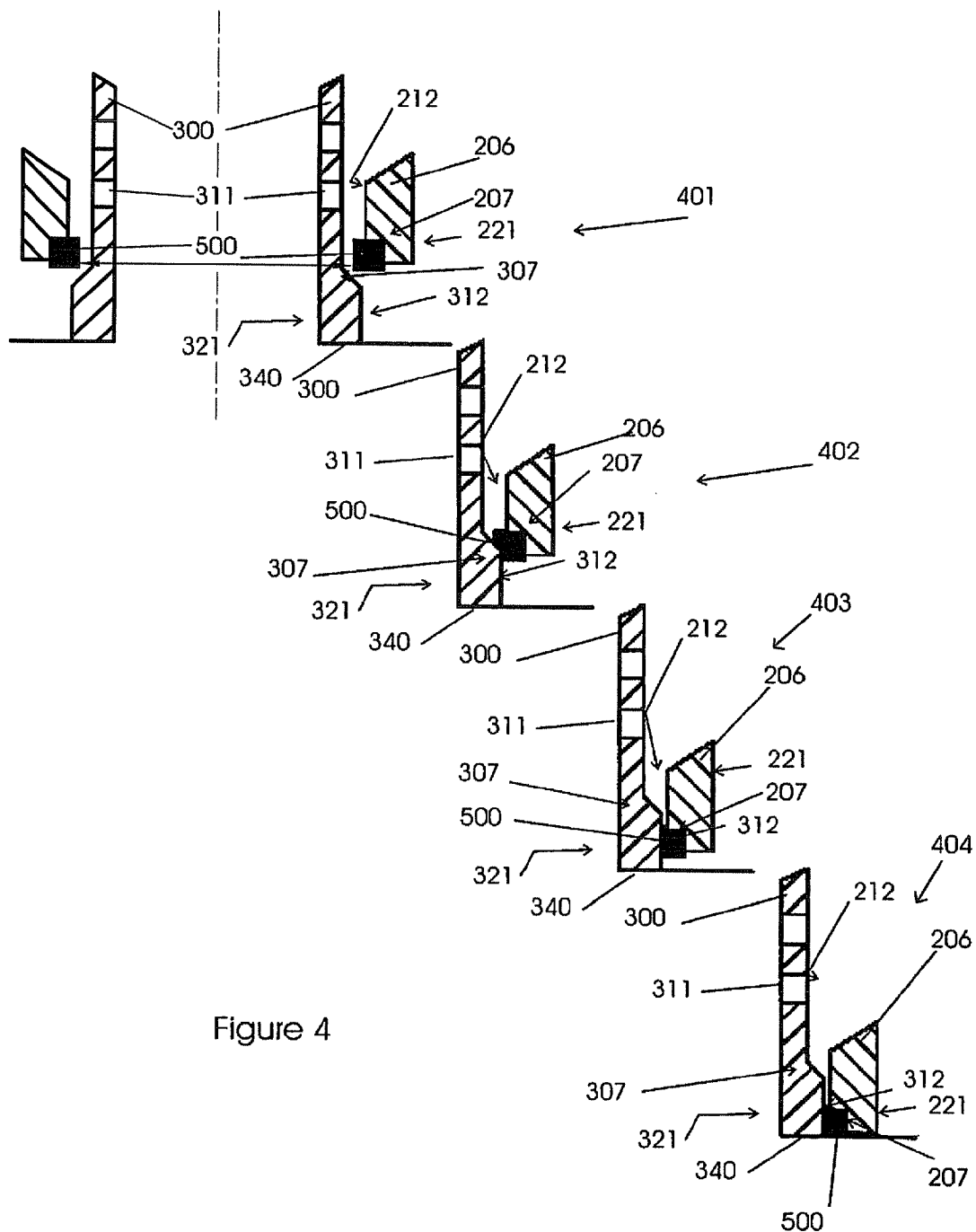
FIG. 4 illustrates details of the filter candle of FIG. 3 during assembly.

FIG. 3 of the drawings is an assembly view of a filter candle 100 according to an embodiment of this invention. FIG. 4 shows details of the filter candle during and after assembly according to an embodiment of this invention. In FIG. 4, by means of four consecutive views 401, 402, 403 and 404, the assembly of a mesh pack 200, and a core tube 300 by inserting the core tube 300 in the mesh pack 200 is shown.

As illustrated, filter candle 100 comprises three completely separable components, namely, mesh pack 200, core tube 300 and guard 400.

The mesh pack 200 is elongated and defines a mesh pack axial opening 203. Although the diameter of the opening 203 is not considered a limitation of this invention, the opening can have, for example, a diameter ranging from 14 mm to 500 mm, such as ranging from 14 mm to 100 mm. The mesh pack comprises a filter medium 205, which is preferably an accordion-like pleated medium having pleating lines parallel to the longitudinal direction of the mesh pack. An end fitting 206 is securely fixed to a first end 221 of the mesh pack. End fitting 206 comprises an inner surface 212 which defines an end fitting opening 208 through the end fitting 206 which is coaxial with the mesh pack axial opening 203 of mesh pack 200. At the second end 222, the filter medium, and hence the mesh pack, is closed by means of an end cap 210, fluid tight fixed to the filter medium 205.

The end fitting 206 is adapted to contact a porous ring-shaped seal 500.

A hollow core tube 300, as is illustrated in FIG. 3, is axially slidably positioned within mesh pack 200. Core tube 300 has a fluid permeable wall 310 and comprises a number of apertures 311, e.g. slits or holes, provided in a fluid permeable section 315. At a first end 321, the core tube has an end outer surface 312. The core tube 300 has an end flange 340, which is fixed to the outer end surface 312. This end flange 340 is extends outwards the core tube and is adapted to engage end fitting 206 of mesh pack 200, preferably in a flush manner.

The core tube 300 further comprises a coupling means 350, extending from end flange 340 of core tube 300, which coupling means 350 can be any suitable coupling such as a bayonet coupling or can be threaded to couple with other components. Core tube 300 provides internal support for filter candle 100.

The core tube 300 is slidably positioned within mesh pack 200 through its end fitting 206 and may be slidably removed from the mesh pack in a similar, but opposite direction. The second end of the core tube 300 is closed by a closing means, e.g. an end cap 360.

The outer end surface 312 of the core tube 300 may comprise a bevelled section 307, bevelled towards the end flange 340 fixed to the outer end surface 321 of the core tube 300. The diameter of the core tube 300 at the outer end surface 312 is in that case larger than the tube diameter at the fluid permeable section 315. Optionally, the bevelled section contact with the end flange 340 fixed to the outer end surface 321 of the core tube 300.

When the three parts of the filter candle are assembled, the ring-shaped seal 500 makes contact with the end flange 340 and the inner surface 212 of the end fitting 260 and the outer end surface 312 of the core tube 300.

A ring-shaped seal 500 is provided around the core tube 300. The ring-shaped seal 500 encircles the core tube and makes contact with the outer end surface 312 of the outer end 321 of the core tube 300 when mounted. The ring-shaped seal 500 has an inner diameter adapted to be slidably moveable over the core tube fluid permeable section 315. The ring-shaped seal 500 has an outer diameter adapted to enable the ring-shaped seal 500 to move along with the end fitting 260, when the three parts of the filter candle are assembled. The ring-shaped seal 500 may move along with the end fitting 260 due to friction forces, e.g. in case the end fitting has a substantially cylindrical inner surface 212. The ring-shaped seal 500 has an outer diameter slightly larger than the inner diameter of the inner surface 212 of the end fitting 260.

As shown in detail in FIG. 4, the inner surface 212 may be substantially cylindrical, and clamps the seal 500 between outer surface 312 of the core tube 300, the end flange 340 and the mesh pack's inner surface 212 by a.o. friction forces. Alternatively, the inner surface may be conical, having a bevelled surface having its largest diameter at the outer end fitting opening 208. Furthermore, the end fitting 206 may comprise a recess 207 along its conical or cylindrical inner surfaces 212, which recess 207 is adapted to receive at least partially the porous ring-shaped seal.

In case, as shown in FIG. 4, the outer end surface 312 of the core tube 300 may comprise a bevelled section 307, the inner diameter of the ring-shaped seal 500 may be slightly larger than the diameter of the fluid permeable section 315 of the core tube. This facilitates the ring-shaped seal 500 to slide easily along the fluid permeable section 315. The bevelled section forces the inner diameter of the ring-shaped seal 500 to increase, when the end-fitting is moved downward in the axial direction of the mesh pack, beyond the bevelled section 315. This results in a seal 500 being clamped in the space between core tube and end fitting. Due to the porosity of the ring-shaped seal 500, the ring shaped seal 500 can at least partially deform and adopt its shape to the space between core tube and end fitting. Due to the shape amendment, the porosity may decrease to some extent, although apparently this does not affect significantly the advantages of the ring shapes seal as subject of the present invention, as the pore sizes are only slightly reduced at the outer surface of the ring-shaped seal, contacting the inner surface 212 and the outer surface 312.

As shown in FIG. 3, an outer guard 400 is provided, defining an opening 401. Outer guard 400 is to receive mesh pack 200 such that mesh pack 200 fills the inner space defined by guard 400. The guard 400 is fluid permeable and comprises apertures 402. The guard is to provide mechanical strength by means of outer support to the filter candle. A screw (not shown) may be provided for securing core tube 300, mesh pack 200 and outer guard 400.

The presence of the porous ring-shaped seal 500 prevents any leakage between mesh pack 200 and core tube 300, due to thermal or mechanical expansion. The porous ring shaped seal 500 is provided out of porous material which has pores having an average pore size being less than or equal to the filter rating of the filter medium.

This causes the porous ring shaped seal 500 not to be completely fluid tight and allows a very small amount of fluid to pass through the seal from the outer side of the filter candle to the inner voids of the candle where filtered fluid is present. It was found that the choice of such porous material allows fluid to bypass the filter medium, thereby preventing the fluid to stagnate at the interstices 502 along the seal 500, the end flange 340, the inner surface 212 of the end fitting 206 and the outer end 312 of the core tube 300. On the other hand, the fluid which has bypassed the filter medium 205 will be filtered by the seal itself to such an extend that the particles taken with the fluid through the seal are not influencing the over all filter rating of the filter candle, which is defined by the filter ration of the filter medium 205. Moreover, due to the relative compressibility of the porous ring shaped seal, the porous ring shaped seal, when compressed, will at least slightly deform and fit to the surfaces of the outer surface of the core tube, the end flange and the inner surface of the end fitting.

As an example according to a preferred embodiment, a mesh pack 200 is provided comprising a filer medium 205. The mesh pack 200 has a longitudinal length of 1300 mm and is provided at its first end 221 with an end fitting 206 being made from stainless steel, such as AISI 304 or AISI 316, and having an inner diameter of 15 mm to 50 mm. The inner surface of the end fitting is substantially cylindrical and has a height of about 50 mm. At the second end 222, the mesh pack 200 is closed using a commonly available end cap. The filter medium 205 may be a variety of metal weaves or sintered metal media 205. Preferably, in this particular embodiment the filter medium is a medium having a filter rating of 60 μm, such as sintered metal fiber medium Bekipor® 60AL3 of NV BEKAERT SA or a woven wire mesh Multipor™ 60 of Bekaert Advanced Filtration.

The core tube 300 is a core tube made from perforated steel, and has an inner diameter of 15 mm to 20 mm and an outer diameter of 20 mm to 30 mm, e.g. 24.11 mm. At a first end 321, the core tube is not perforated but impermeable along a length of 1200 mm, measured in longitudinal direction starting from the end flange 340, which end flange 340 coupled to this end 321. The end flange 340 has diameter 50 mm. The second end 322 of the core tube may be closed in a conventionally known way.

Between the outer surface 312 of the core tube 300, the end flange 340 and the inner surface 212 of the end fitting 206 of the mesh pack 200, a porous ring-shaped seal 500 is provided. The porous ring-shaped seal 500 is provided from Stainless steel, and has a substantially rectangular cross section. For the embodiment using a core tube having an outer diameter of 24.1 mm, the ring shaped seal has an inner diameter of 24.0 mm and has a small side of 2 mm in radial direction and his long side of 2 mm in longitudinal or axial direction of the core tube. The average pore size of the porous ring-shaped seal is less than 20 μm. The average porosity of the porous ring-shaped seal is 50% to 60%.

When these core tube 300, porous ring-shaped seal 500 and mesh pack 200 are mounted, additionally being provided with a conventionally known guard, the porous ring-shaped seal 500 is clamped between the outer surface 312 of the core tube 300, the end flange 340 and the mesh pack's inner surface 212 and makes contact with outer surface 312 of the core tube 300, the end flange 340 and the mesh pack's inner surface 212.

Other arrangements for accomplishing the objectives of the filter candle embodying the invention will be obvious for those skilled in the art.

It is to be understood that although preferred embodiments, specific constructions and configurations, as well as materials, have been discussed herein for devices according to the present invention, various changes or modifications in form and detail may be made without departing from the scope and spirit of this invention. For example, the porous ring-shaped structure may be sintered metal powder, sintered short metal fibers, which short metal fibers are described in WO02/057035, or a combination of metal powder or short fibers, optionally, combined with metal long fibers. Alternatively the porous ring-shaped structure may be metal foam, preferably open cell foam.

It is understood that the dimensions, such as inner diameter and outer diameter, of the porous ring-shaped structure is adapted to the inner diameter of the end fitting and the outer diameter of the core tube. Also the height of the porous ring-shaped structure can be varied according to the particular design of the filter candle.

The invention claimed is:

1. A filter candle comprising:
   an elongated mesh pack for filtering a fluid, the elongated mesh pack defining an mesh pack axial opening, the mesh pack comprising a filter medium for filtration of a fluid, the mesh pack having an end fitting securely fixed to the filter medium, the end fitting providing a first end of the mesh pack, the end fitting having an end inner surface defining an end fitting opening through the end fitting, the end fitting opening being co-axial with the axial opening of the mesh pack;
   a hollow core tube having a fluid permeable wall, the core tube is positioned within the axial opening of the mesh pack and being removably slidable through the mesh pack axial opening, the core tube having a first outer end having an outer end surface, the core tube having an end flange fixed to the outer end surface, the end flange is suitable for engaging the end fitting on the mesh pack;
   a ring-shaped seal provided between and making contact with the outer end surface of the core tube and the end inner surface of the end fitting and the end flange, the seal encircles the outer end surface of the outer end of the core tube, wherein the seal is a porous ring-shaped structure comprising a multitude of pores, which pores have an average pore size being equal or less than the filter rating of the filter medium such that the seal is not completely fluid tight and allows an amount of fluid to pass through the porous ring-shaped structure in order to prevent stagnation of the fluid within the filter candle;
   wherein the outer end surface of the core tube comprises at least one bevelled section, bevelled towards the end flange fixed to the outer end surface and contacting the end flange fixed to the outer end surface; and
   wherein the bevelled section and the seal are dimensioned so that, when the end-fitting is moved axially beyond the bevelled section, the inner diameter of the ring-shaped seal is increased and the seal moves beyond the bevelled section and is clamped between the core tube and the end fitting.

2. The filter candle according to claim 1, wherein the porous ring-shaped structure comprises sintered metal powder.

3. The filter candle according to claim 1, wherein the porous ring-shaped structure comprises sintered metal fibers.

4. The filter candle according to claim 1, wherein the porous ring-shaped structure consists of sintered metal fibers.

5. The filter candle according to claim 1, wherein the porous ring-shaped structure has a substantially rectangular cross section.

6. The filter candle according to claim 1, wherein the end inner surface of the end fitting is substantially cylindrical.

7. The filter candle according to claim 1, wherein the end inner surface of the end fitting is substantially conical.

8. The filter candle according to claim 1, wherein the end inner surface of the end fitting comprises a recess.

9. A method of using a filter candle for filtration of molten or dissolved polymer comprising:
   providing a filter candle according to claim 1;
   passing molten or dissolved polymer through the filter candle; and
   separating particles from the molten or dissolved polymer.

\* \* \* \* \*